US009049908B2

(12) United States Patent
Jiang

(10) Patent No.: US 9,049,908 B2
(45) Date of Patent: Jun. 9, 2015

(54) BRAKE SYSTEM FOR WHEELED LUGGAGE CASE AND CONTROL DEVICE THEREOF

(71) Applicant: DONGGUAN JIANG SHUN SUITCASES AND HANDBAGS SPARE PARTS CO., LTD., Guangdong (CN)

(72) Inventor: Hanhui Jiang, Guangdong (CN)

(73) Assignee: Dongguan Jiang Shun Suitcases and Handbags Spare Parts Co., Ltd., Guangdong (CN)

( * ) Notice: Subject to any disclaimer, the term of this patent is extended or adjusted under 35 U.S.C. 154(b) by 174 days.

(21) Appl. No.: 13/845,593

(22) Filed: Mar. 18, 2013

(65) Prior Publication Data

US 2013/0319800 A1    Dec. 5, 2013

(30) Foreign Application Priority Data

Jun. 4, 2012 (CN) .................... 2012 2 0260836 U

(51) Int. Cl.
| | |
|---|---|
| *F16D 65/14* | (2006.01) |
| *A45C 5/14* | (2006.01) |
| *F16C 1/12* | (2006.01) |
| *B60T 1/00* | (2006.01) |
| *B60T 7/10* | (2006.01) |
| *B60B 33/00* | (2006.01) |
| *B60T 11/04* | (2006.01) |
| *G05G 7/00* | (2006.01) |
| *F16D 125/60* | (2012.01) |
| *F16D 125/66* | (2012.01) |
| *F16D 125/62* | (2012.01) |
| *F16C 1/16* | (2006.01) |
| *F16D 121/16* | (2012.01) |

(52) U.S. Cl.
CPC . *A45C 5/145* (2013.01); *F16C 1/12* (2013.01); *Y10T 74/2042* (2015.01); *F16D 2125/60* (2013.01); *F16D 2125/66* (2013.01); *F16D 2125/62* (2013.01); *B60T 1/005* (2013.01); *B60T 7/10* (2013.01); *B60B 33/0092* (2013.01); *B60T 11/046* (2013.01); *F16C 1/16* (2013.01); *G05G 7/00* (2013.01); *F16D 2121/16* (2013.01); *B60B 2200/45* (2013.01)

(58) Field of Classification Search
CPC ..... B60T 11/04; B60T 11/046; B60T 11/043; F16D 2125/60; F16D 2125/58; F16D 2125/62; F16D 2125/64; F16D 2125/645; F16D 2125/66; F16D 2125/68; B60B 33/0092
USPC ...... 188/19, 20, 21, 22, 24.22, 2 D, 2 F, 1.12; 16/35 R, 113.1, 114.1, 405
See application file for complete search history.

(56) References Cited

U.S. PATENT DOCUMENTS

| | | | |
|---|---|---|---|
| 6,170,122 B1 * | 1/2001 | Kuo ................................ | 16/405 |
| 6,286,183 B1 * | 9/2001 | Stickel et al. ................. | 16/35 R |
| 8,261,887 B2 * | 9/2012 | Tseng ........................ | 188/24.22 |

(Continued)

*Primary Examiner* — Nicholas J Lane
(74) *Attorney, Agent, or Firm* — Rosenberg, Klein & Lee

(57) ABSTRACT

A brake system for the wheeled luggage case and control device thereof are provided. The control device includes: a case body, a press positioning assembly, a slide block, a fixed pulley, and a brake wire. The press positioning assembly is actuated to slide at the top of the case body, such that the resisting convex block slides from one end of the slope surface to the other end of the slope surface, and the slide block is urged towards the bottom of the case body, such that the inner wire of the brake wire driven by the slide block controls the brake member to brake the wheel of the wheeled luggage case. It is more convenient to use the control device to brake the wheel of the wheeled luggage case.

10 Claims, 8 Drawing Sheets

(56) References Cited

U.S. PATENT DOCUMENTS

| | | | |
|---|---|---|---|
| 8,714,314 B1* | 5/2014 | Chen | 188/1.12 |
| 2011/0083928 A1* | 4/2011 | Liao | 188/2 D |
| 2011/0192690 A1* | 8/2011 | Jiang | 190/18 A |
| 2012/0160617 A1* | 6/2012 | Qi et al. | 188/1.12 |
| 2012/0311821 A1* | 12/2012 | Eguchi | 16/35 R |
| 2014/0000989 A1* | 1/2014 | Lai | 188/69 |
| 2014/0216862 A1* | 8/2014 | Chen | 188/31 |

* cited by examiner

BRAKE SYSTEM FOR WHEELED LUGGAGE CASE AND CONTROL DEVICE THEREOF

FIELD OF THE INVENTION

The present disclosure relates to luggage cases, and more particularly relates to a brake system for the wheeled luggage case and control device thereof.

BACKGROUND OF THE INVENTION

Luggage cases, such as suitcases, travel bags, etc., are usually provided with wheels at the bottom, in order to facilitate movement of the luggage. One problem with the conventional wheeled luggage case is that, when people are taking public transportations, such as buses, subways, the luggage cases equipped with wheels may tend to roll away from the users with the starting, changing of speed, braking of the transportations. In order to prevent the wheels from rotating under certain conditions, some brake systems were proposed to the luggage cases to stop the wheel when necessary.

However, it is very inconvenient for the conventional brake system to brake the wheel.

Therefore, there is room for improvement within the art.

SUMMARY OF THE INVENTION

In one aspect of the present disclosure, a brake system for the wheeled luggage case and a control device thereof which can more easily control the brake of the wheel are desired.

A control device of a brake system for the wheeled luggage case includes:
  a case body, defining an elongated hole on top thereof communicating with a cavity thereof;
  a press positioning assembly, positioned on the top of the case body, the press positioning assembly comprising:
    a main body, slidably located on an outside of the top of the case body; and
    a resisting convex block, fixed to a side of the main body extending through the elongated hole, the resisting convex block is capable of sliding along the elongated hole;
    a slide block, received in the cavity of the case body and slidably located between the top end and the bottom end of the case body, the slide block forms a slope surface on an end thereof adjacent to the elongated hole, the resisting convex block resisting the slope surface;
    a fixed pulley, received in the cavity of the case body and located on a side of the slide block;
    a brake wire, comprising an outer tube and an inner wire received therein, one end of the inner wire is fixed to the slide block after surrounding the fixed pulley, the other end is configured to control a brake member to brake a wheel of the wheeled luggage case; and
    a resilient member, having two ends abutting an inner sidewall of the case body and the slide block, respectively;
  wherein the press positioning assembly is actuated to slide at the top of the case body, such that the resisting convex block slides from one end of the slope surface to the other end of the slope surface, and the slide block is urged towards the bottom of the case body, such that the inner wire of the brake wire driven by the slide block controls the brake member to brake the wheel of the wheeled luggage case.

According to one embodiment, the case body comprises a front housing and a rear housing, the front housing defines a receiving groove, the rear housing seals an opening of the receiving groove and forms the cavity of the case body.

According to one embodiment, the front housing comprises two spaced guide blocks located at the bottom of the receiving groove and a restriction column positioned between the two guide blocks, the slide block defines an elongated restriction hole in a middle portion thereof, the restriction column extends through the restriction hole, the slide block is constrained between the two guide blocks, such that the slide block is capable of sliding between the top end and the bottom end of the case body.

According to one embodiment, the receiving groove defines a latch groove at a margin of the bottom thereof, and the outer tube of the brake wire is latched in the latch groove.

According to one embodiment, the case body is provided with two parallel spaced rails located on the outside of the top thereof, the main body is located between the two rails sliding along the two rails.

According to one embodiment, the slope surface is a wedge surface, convex curved surface or depressed curved surface formed on the end of the slide block.

According to one embodiment, the slide block is provided with a positioning column at an end thereof adjacent to the bottom of the case body, the resilient member is a compressed spring or elastic rubber tube having one end abutting the inner sidewall of the case body, the other end being sleeved on the positioning column.

According to one embodiment, the number of the fixed pulley and the brake wire is two, the slide block is positioned between the two fixed pulleys, two ends of the two inner wires surround the two fixed pulleys and are fixed to the two sides of the end of the slide block.

According to one embodiment, the resisting convex block is provided with a pulley at a free end thereof capable of rolling on the slope surface.

A brake system for the wheeled luggage case includes:
  a control device as previously described;
  a buffer device, comprising:
    an outer sleeve;
    an inner sleeve, received in the outer sleeve, and the inner sleeve is capable of sliding along an axial of the outer sleeve, one end of the brake wire extends through the top of the outer sleeve and is fixed to the top of the inner sleeve;
    an elastic member, received in the outer sleeve and having two ends abutting an inner sidewall of the top of the outer sleeve and the inner sleeve, respectively, thus allowing the inner sleeve to return to an initial position after the inner sleeve slides towards the top of the outer sleeve;
    a support, one end of the support extends through the bottom of the inner sleeve and is provided with a support gasket, the other end of the support is connected to the brake member for braking the wheel of the wheeled luggage case; and
    a buffer elastic member, having two ends abutting the support gasket and the inside of the bottom of the inner sleeve;
  the wheel of the wheeled luggage case, defining a plurality of annular tooth spaces surrounding a shaft of the wheel; and
  the brake member, comprising a hook capable of engaging the annular tooth space;
  wherein, with the brake wire being pulled upwards, the inner sleeve slides driven by the brake wire, and the support is moved upwards driven by the inner sleeve, such that the wheel is braked by the brake member, wherein with the wheel is forcibly pushed to rotate, the support is moved downwards and abuts the buffer elastic member, such that the buffer elastic member is deformed, and the hook is urged by the buffer elastic member to slide from one tooth space to another tooth space.

When the wheel of the luggage case needs to be braked, the press positioning assembly is actuated to slide at the top of the case body, such that the resisting convex block of the press positioning assembly slides from one end of the slope surface to the other end of the slope surface, and the slide block is urged towards the bottom of the case body, such that the inner wire of the brake wire driven by the slide block controls the brake member to brake the wheel of the wheeled luggage case, therefore, it is more convenient to use the control device to brake the wheel of the wheeled luggage case.

These and other objects, advantages, purposes and features will become apparent upon review of the following specification in conjunction with the drawings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described. In addition, to the extent that orientations of the embodiments are described, such as "top," "bottom," "front," "rear," "right," and the like, the orientations are to aid the reader in understanding the embodiment being described, and are not meant to be limiting.

Figure 1:
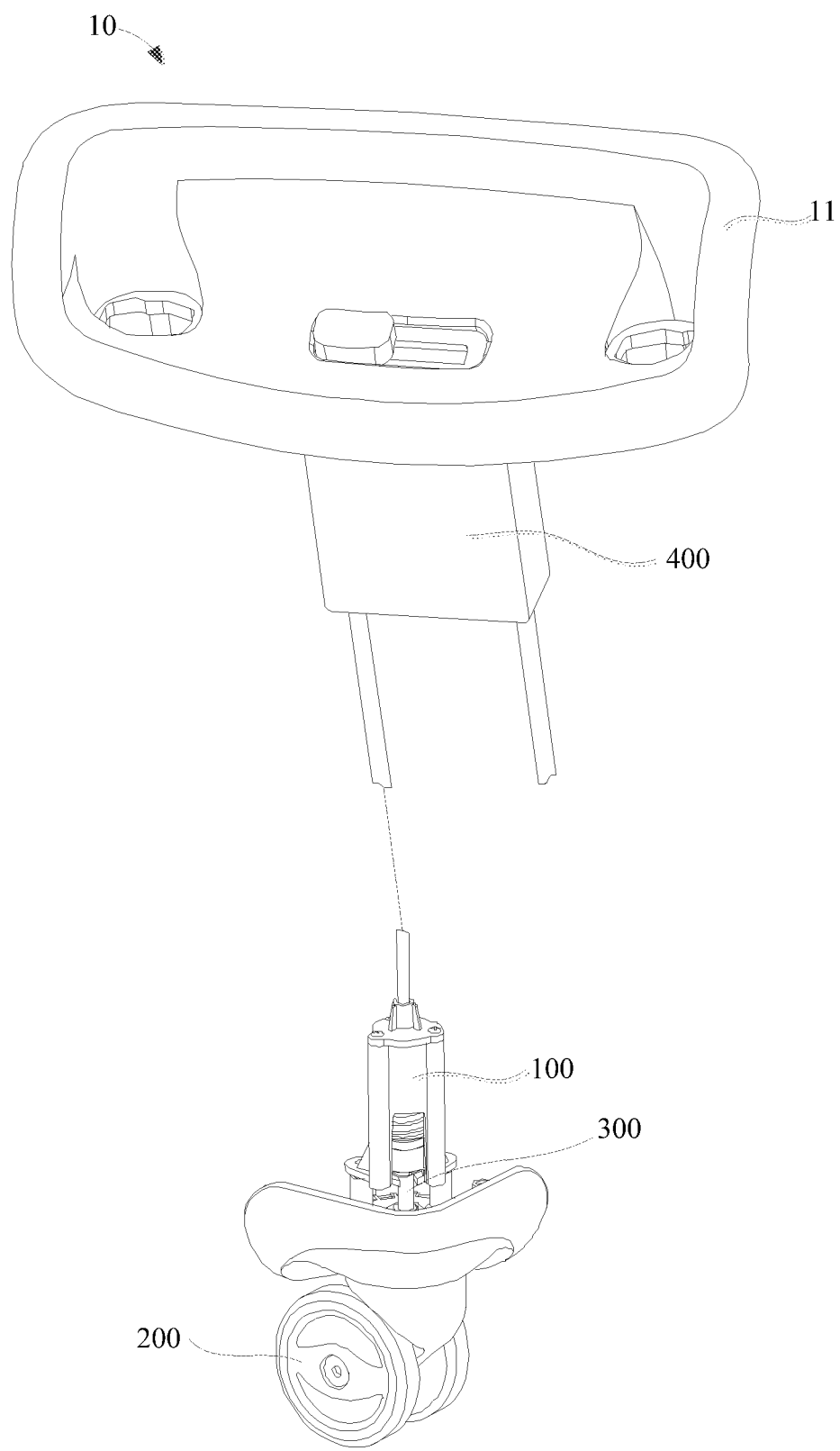
FIG. 1 is a schematic, perspective view of an embodiment of a brake system for the wheeled luggage case.

Referring to FIG. 1, an embodiment of a brake system 10 for the wheeled luggage case includes a buffer device 100, a wheel 200, a brake member 300, and a control device 400.

The brake member 300 is used for brake the wheel 200 when necessary, so as to stop the movement of the luggage case. The wheel 200 is usually located at the bottom (or other place, such as a side) of the luggage case. The wheel 200 may either be a caster type or directional type. The buffer device 100 is configured to provide a resilient cushioning force to the brake device 300, thereby preventing the brake system 10 from being damaged by an overwhelming push force after braking the wheel 200. The control device 400 is configured to control the brake member 300 to brake the wheel 200.

Figure 2:
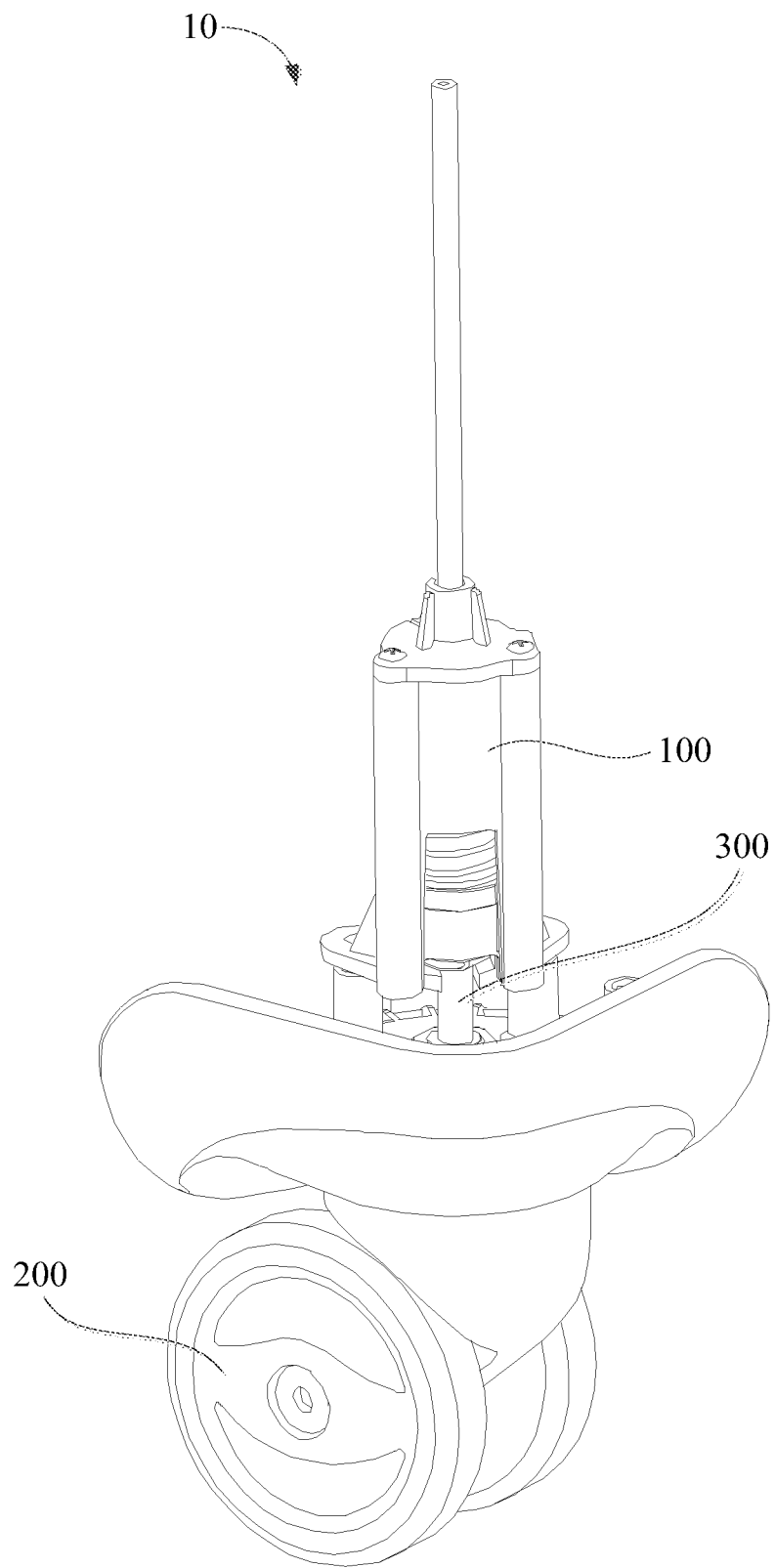
FIG. 2 is a schematic, perspective view of the buffer device and the wheel of the brake system for the wheeled luggage case shown in FIG. 1.
Figure 3:
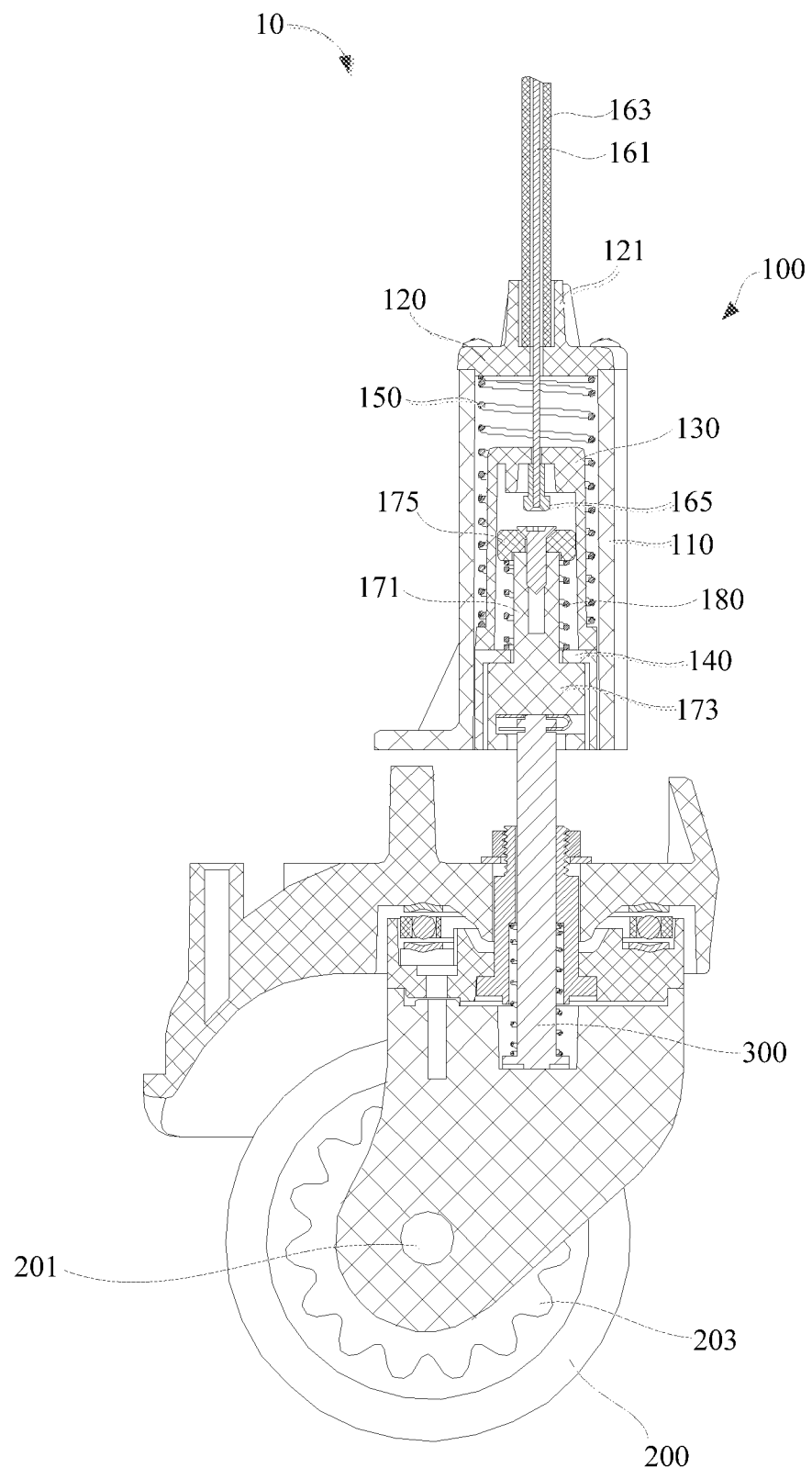
FIG. 3 is a sectional view of the brake system for the wheeled luggage case shown in FIG. 2.
Figure 4:
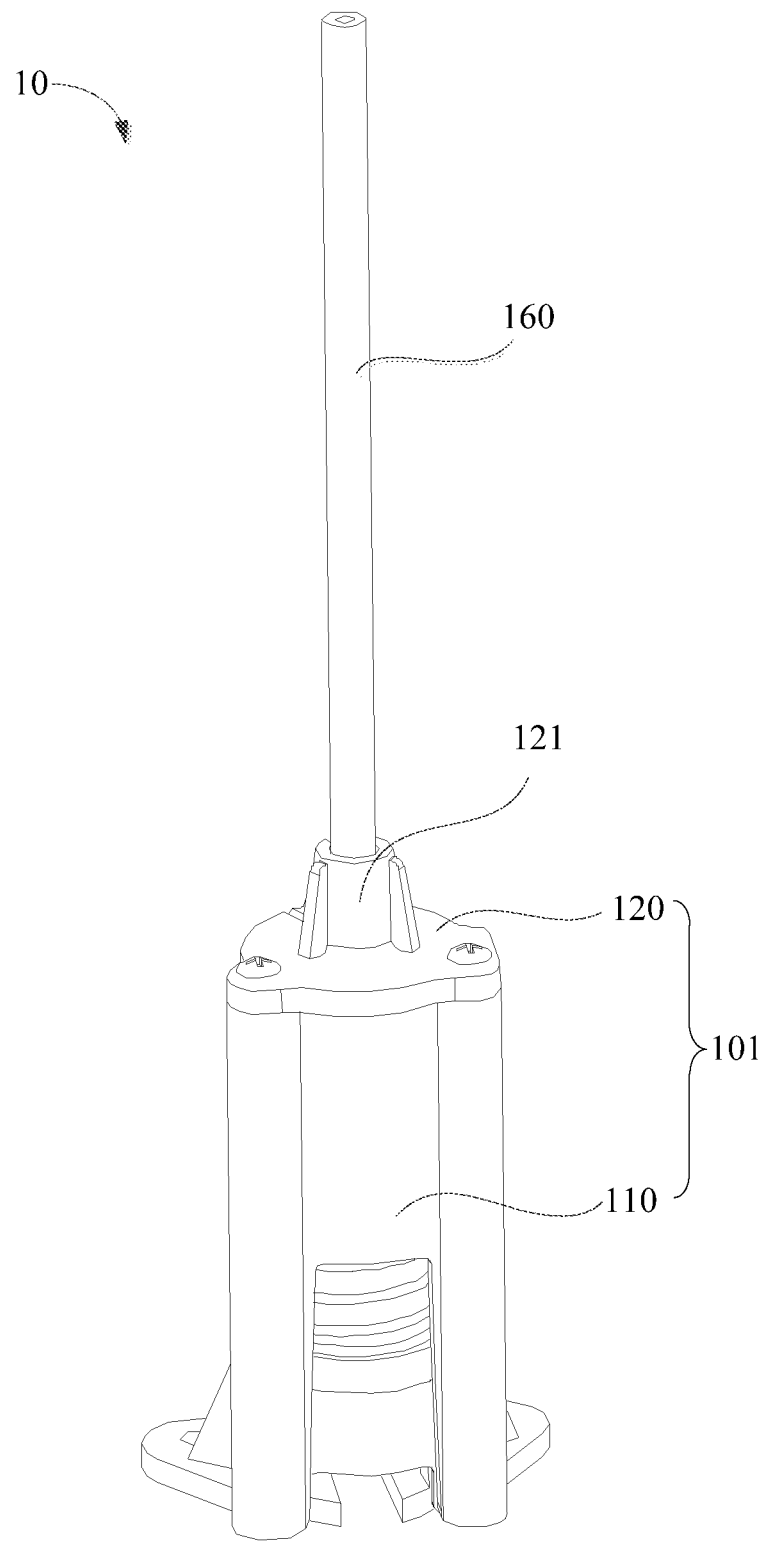
FIG. 4 is a schematic, perspective view of the buffer device of the brake system for the wheeled luggage case shown in FIG. 2.
Figure 5:
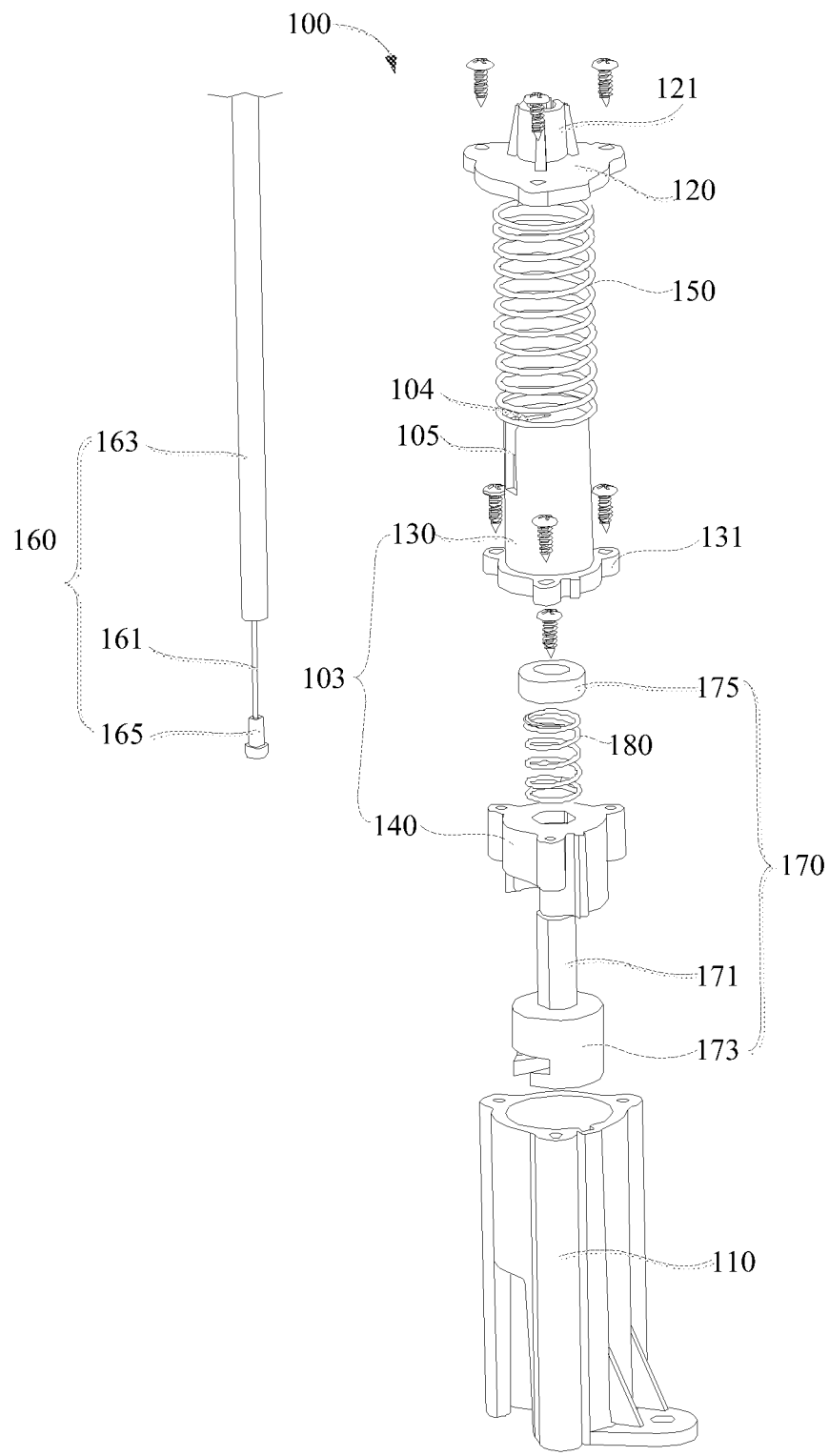
FIG. 5 is an exploded view of the buffer device shown in FIG. 3.

Referring to FIG. 2 and FIG. 3, the brake member 300 and the wheel 200 may have the structure of the conventional braking system of luggage case, in the illustrated embodiment, the wheel 200 defines a plurality of annular tooth spaces 203 surrounding a shaft 201 of the wheel 200. The brake member 300 includes a hook (not shown) capable of engaging the annular tooth space 203.

The buffer device 100 includes an outer sleeve 101, an inner sleeve 103, an elastic member 150, a brake wire 160, a support 170, and a buffer elastic member 180. The brake wire 160 is configured to pull the inner sleeve 103 to vertically move inside the outer sleeve 101. The elastic member 150 is configured to provide an elastic restoring force to the inner sleeve 103, such that when the inner sleeve 103 is braking the wheel 200, it may return to its initial position automatically after releasing the brake wire 160. The support 170 is connected to the brake member 300. The buffer elastic member 180 is configured to provide an elastic buffer force to the support 170.

Referring to FIG. 2 to FIG. 5, in the illustrated embodiment, the outer sleeve 101 includes a housing 110 and the housing cover 120. The housing 110 is shaped as a cylinder with two openings at both ends. The housing cover 120, which is fixed to one end of the housing 110, is provided with a convex neck portion 121 at a top surface of the housing cover 120.

The inner sleeve 103 is received in the outer sleeve 101, and the inner sleeve 103 is capable of sliding along an axial of the outer sleeve 101. In the illustrated embodiment, the inner sleeve 103 includes an upper sleeve 130 and a lower sleeve 140. The upper sleeve 130 is shaped as a cylinder open at one end and closed at the other end. The lower sleeve 140 is fixed to the upper sleeve 130 sealing the open end.

The lower sleeve 140 is shaped as a cylinder open at one end and closed at the other end. The lower sleeve 140 defines a cylinder-like cavity inside. The end of the lower sleeve 140 with the opening is fixed to the end of the upper sleeve 130 with the opening. One end of the support 170, which is provided with a support gasket 175, extends through the lower sleeve 140.

The elastic member 150 is received in the outer sleeve 101, and two ends of the elastic member 150 abut an inner sidewall of the top of the outer sleeve 101 and the inner sleeve 103, respectively, thus the inner sleeve 101 is capable of returning to an initial position after it slides towards the top of the outer sleeve 101.

In the illustrated embodiment, the elastic member 150 is a compression spring or an elastic rubber tube being coiled around the inner sleeve 103. The inner sleeve 103 is provided with a flange 131 located at the open end of the upper sleeve 130 to resist the elastic member 150.

The brake wire 160 has one end extending through the top of the outer sleeve 101 and being fixed to the top of the inner sleeve 103. Specifically, one end of the brake wire 160 is connected to the closed end of the upper sleeve 130. The brake wire 160 includes an outer tube 163 and an inner wire 161 received therein. The inner wire 161 extends through the convex neck portion 121 of the housing cover 120 of the outer sleeve 101. The outer tube 163 of the brake wire 160 is fixed to the convex neck portion 121 of the housing cover 120 of the outer sleeve 101. The support 170 is located at the other opening of the housing 110 of the outer sleeve 101.

In the illustrated embodiment, the end of the inner wire 161 of the brake wire 160 is provided with a positioning member 165. The positioning member 165 is shaped as a cylinder having a diameter greater than that of the inner wire 161 of the brake wire 160. The inner sleeve 103 defines a first slot 104 at the top end surface extending radially along the inner sleeve 103. The inner sleeve 103 further defines a second slot 105 at the side surface extending along an axis of the inner sleeve 103 and communicating the first slot 104. The width of the second slot 105 is greater than the width of the first slot 104, such that the positioning member 165 can extend through the second slot 105 and be latched in the inner sleeve 103, and the inner wire 161 can extend through the first slot 104.

One end of the support 170 with the support gasket 175 extends through the bottom of the inner sleeve 103, and the other end is connected the brake member 300 configured to brake the wheel 200.

In the illustrated embodiment, the support 170 includes a rod 171 and a guide portion 173. The guide portion 173 is shaped as a cylinder and fixed to one end of the rod 171. The support gasket 175 is fixed to the other end of the rod 171.

The diameter of the guide portion 173 is less than that of the lower sleeve 140, thus allowing the guide portion to slide along an axis of the lower sleeve 140. The brake member 300 is fixed to the guide portion 173. The upper sleeve 130 defines a cylinder cavity. The support gasket 175 is round and has a less diameter than that of the upper sleeve 130. The support gasket 175 is fixed to the other end of the rod 171 by a threaded fastener.

The buffer elastic member 180 has two ends abutting the support gasket 175 and the inside of the bottom of the inner sleeve 103. In the illustrated embodiment, the buffer elastic member 180 is a compression spring or an elastic rubber tube being coiled around the support 170.

When the brake wire 160 is pulled upwards, the inner sleeve 103 driven by the brake wire 160 slides, and the support 170 is moved upwards driven by the inner sleeve, such that the wheel 200 is braked by the brake member 300. When the wheel 200 is forcibly pushed to rotate, the support 170 is moved downwards and abuts the buffer elastic member 180, such that the buffer elastic member 180 is deformed. Then, by the force of the buffer elastic member 180, the hook is urged to slide from one tooth space 203 to another tooth space 203.

Figure 6:
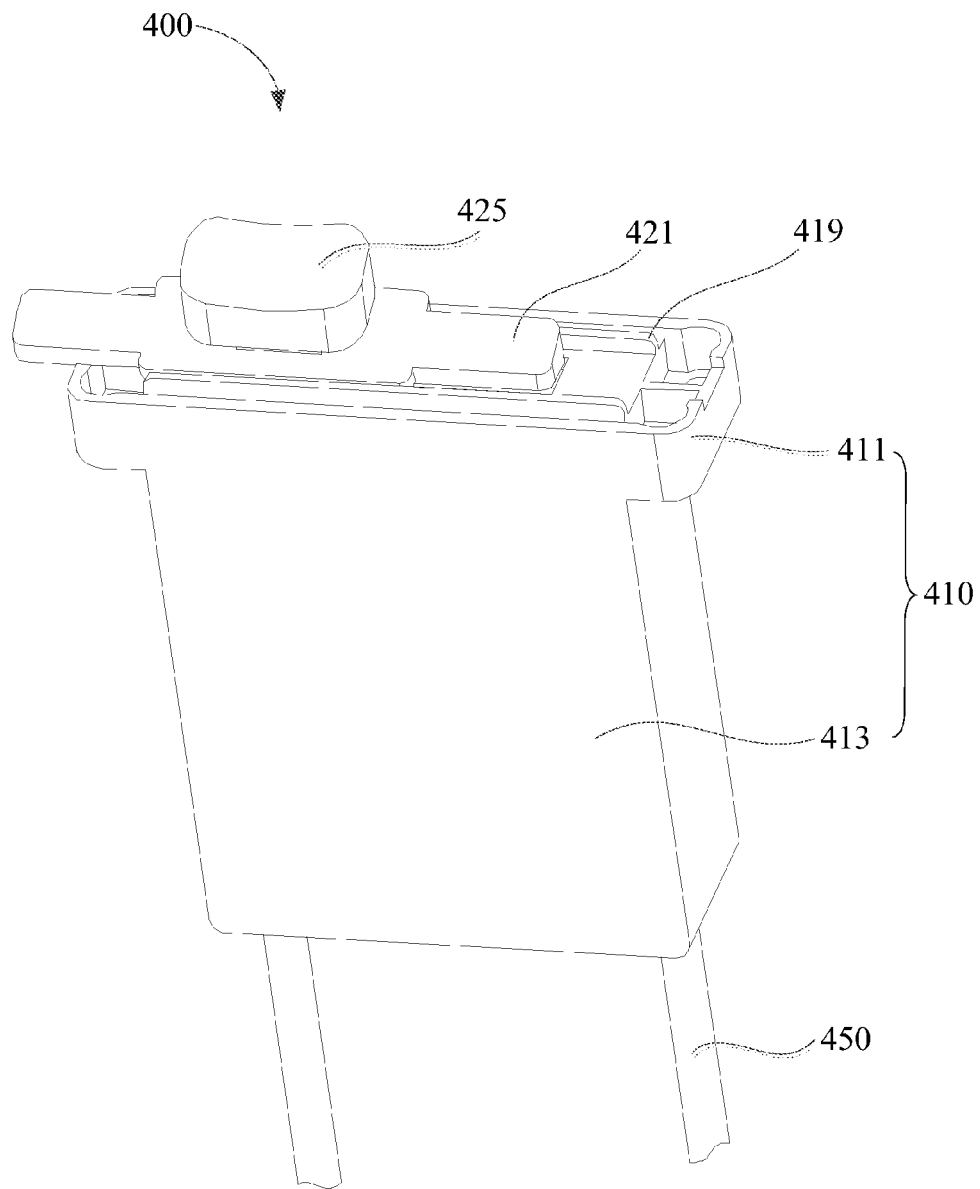
FIG. 6 is a schematic, perspective view of a control device shown in FIG. 1.

Referring to FIG. 1 and FIG. 6, the control device 400 is located on a top portion 11 of the wheeled luggage case near to the grip for easy control. It is to be understood that the control device 400 may be located at other place, such as the side of the wheeled luggage case.

Figure 7:
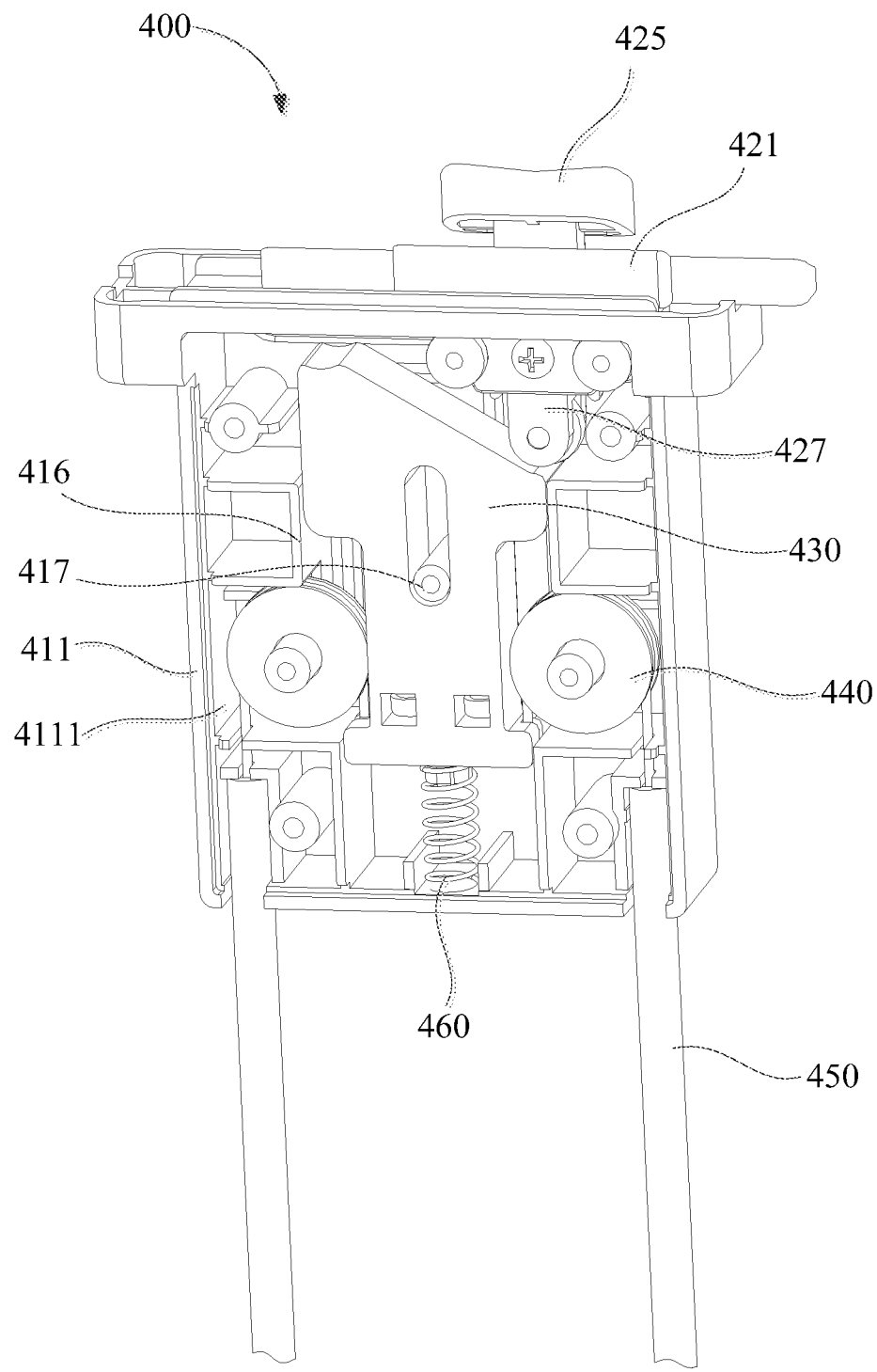
FIG. 7 is a schematic, perspective view of a control device shown in FIG. 6 without the rear housing.
Figure 8:
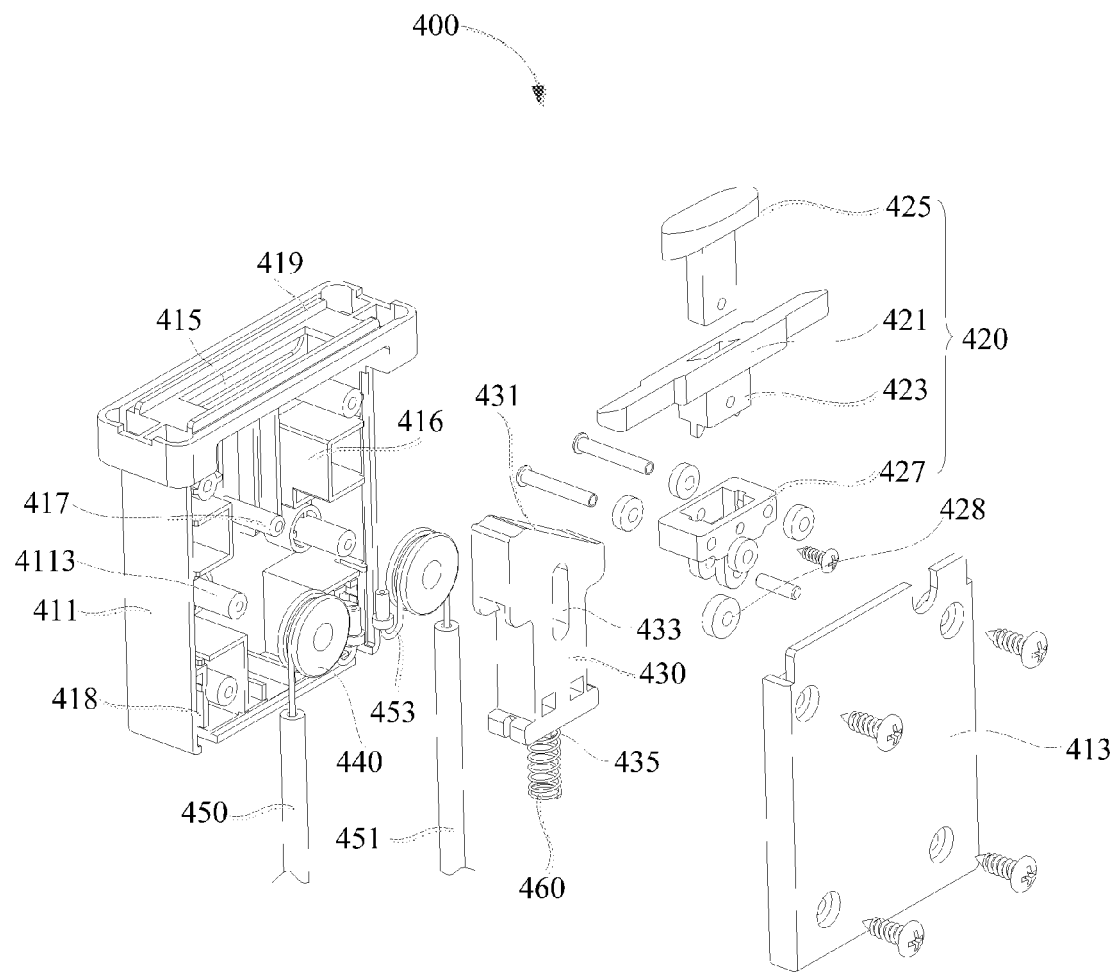
FIG. 8 is an exploded view of the control device shown in FIG. 6.

Referring to FIG. 7, and FIG. 8, the control device 400 includes a case body 410, a press positioning assembly 420, a slide block 430, a fixed pulley 440, a brake wire 450, and a resilient member 460.

The case body 410 defines an elongated hole 415 on the top communicating with a cavity of the case body 410. In the illustrated embodiment, the case body 410 includes a front housing 411 and a rear housing 413. The front housing 411 defines a receiving groove 4111, the rear housing 413 seals an opening of the receiving groove 4111 and forms the cavity of the case body 410.

The press positioning assembly 420 is positioned on the top of the case body 410. The press positioning assembly 420 includes a main body 421, a resisting convex block 423, a push button 425, and an insert portion 427. The main body 421 is slidably located on an outside of the top of the case body 410. The resisting convex block 423 is fixed to a side of the main body 421 extending through the elongated hole 415 of the case body 410. The resisting convex block 423 is capable of sliding along the elongated hole 415 of the case body 410. The insert portion 427 is latched to the resisting convex block 423 after the resisting convex block 423 extending through the elongated hole 415 of the case body 410. The insert portion 427 is configured to prevent the resisting convex block 423 from detaching from the elongated hole 415. It is noted that, the insert portion 427 may be omitted.

In the illustrated embodiment, in order to maintain a stable slide of the press positioning assembly 420 on top of the case body 410, the case body 410 is provided with two parallel spaced rails 419 located on the outside of the top of the case body 410. The main body 421 is located between the two rails 419 sliding along the two rails 419.

The slide block 430 is received in the cavity of the case body 410 and is slidably located between the top end and the bottom end of the case body 410. The slide block 430 forms a slope surface 431 on an end of the slide block adjacent to the elongated hole 415, and the insert portion 427 of the press positioning assembly 420 resists the slope surface 431. In alternative embodiment, the resisting convex block 423 resists the slope surface 431, as long as the insert portion 427 is omitted. The slope surface 431 may be a wedge surface, convex curved surface or depressed curved surface formed on the end of the slide block 430.

In the illustrated embodiment, the front housing 411 of the case body 410 includes two spaced guide blocks 416 located at the bottom of the receiving groove 4111 and a restriction column 417 positioned between the two guide blocks 416. The slide block 430 defines an elongated restriction hole 433 in a middle portion of the slide block 430, the restriction column 417 extends through the restriction hole 433. The slide block 430 is constrained between the two guide blocks 416, such that the slide block 430 is capable of sliding between the top end and the bottom end of the case body 410.

The fixed pulley 440 is received in the cavity of the case body 410 and located on a side of the slide block 430. In the illustrated embodiment, the fixed pulley 440 sleeves and is fixed to an axle 4113 on the front housing 411 of the case body 410.

The brake wire 450 includes an outer tube 451 and an inner wire 453 received therein. One end of the inner wire 453 is fixed to the slide block 430 after it surrounds the fixed pulley 440, and the other end of the inner wire 453 is configured to control the brake member 300 to brake the wheel 200. In the illustrated embodiment, the receiving groove of the front housing 411 of the case body 410 defines a latch groove 418 at a margin of the bottom receiving groove 4111, and the outer tube 451 of the brake wire 450 is latched in the latch groove 418.

The brake wire 450 and the brake wire 160 of the buffer device 100 may be the same wire, or may be two wires connected to each other.

The two ends of the resilient member 460 abut an inner sidewall of the case body 410 and the slide block 430, respectively. In the illustrated embodiment, the slide block 430 is provided with a positioning column 435 at an end of the slide block 430 adjacent to the bottom of the case body 410, and the resilient member 460 is a compressed spring or elastic rubber tube which has one end abutting the inner sidewall of the case body 410, the other end being sleeved on the positioning column 435.

When the press positioning assembly 420 is actuated to slide at the top of the case body 410, the resisting convex block 423 slides from one end of the slope surface 431 to the other end of the slope surface 431, and the slide block 430 is urged towards the bottom of the case body 410, such that the inner wire 453 of the brake wire 450 driven by the slide block 430 controls the brake member 300 to brake the wheel 200 of the wheeled luggage case.

In addition, in order to reduce the friction between the press positioning assembly 420 and the slide block 430, a free end of the insert portion 427 of the press positioning assembly 420 is provided with a pulley 428 capable of rolling on the slope surface 431. In alternative embodiment, the pulley 428 is positioned at a free end of the resisting convex block 423 as long as the insert portion 427 is omitted.

Furthermore, the number of the fixed pulley 440 and the brake wire 450 is two, the slide block 430 is positioned between the two fixed pulleys 440, and two ends of the two inner wires 453 surround the two fixed pulleys 440 and are fixed to the two sides of the end of the slide block 430, such that two wheels 200 are controlled by the two brake wires 450, respectively.

It is to be understood that, the buffer device 100 may be omitted, and then the control device 400 controls the brake member 300 by the brake wire 450 directly.

Compared to the prior art, the brake system 10 for the wheeled luggage case of the present disclosure has at least the following advantages:

(1) When the wheel 200 is braked by the brake member 300, even if the wheel 200 is forced to rotate by an overwhelming push force, the brake member 300 pulls the support 170 downwards, and the support 170 resists the buffer elastic member 180 by the support gasket 175, such that the buffer elastic member 180 is elastically deformed, thereby providing a resilient cushioning force on the brake member 300 and avoiding the damage of the components such as brake member 300 and wheel 200, and so on. Therefore, the brake system 10 for the wheeled luggage case can effectively prevent damage to the wheel 200 by an overwhelming push force.

(2) Since a plurality of annular tooth spaces 203 surround a shaft 201 of the wheel 200, when the wheel 200 is forced to rotate, the brake member 300 is urged to slide from one tooth space 203 to another tooth space 203 by the force of the buffer elastic member 180, and makes a noise such as "da, da, da" to remind the user that the wheel 200 has been braked and needs to be released. Thus, the braking system 10 for the wheeled luggage case can alert the user to release the wheel 200.

(3) When it is necessary to brake the wheel 200, the press positioning assembly 420 is actuated to slide at the top of the case body 410, the resisting convex block 423 slides from one end of the slope surface 431 to the other end of the slope surface 431, and the slide block 430 is urged towards the bottom of the case body 410, such that the inner wire 453 of the brake wire 450 driven by the slide block 430 controls the brake member 300 to brake the wheel 200 of the wheeled luggage case. Therefore, it is more convenient to use the control device 400 to brake the wheel 200 of the wheeled luggage case.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. A control device of a brake system for a wheeled luggage case, comprising:

a case body, defining an elongated hole on a top end of said case body, said elongated hole communicating with a cavity of said case body;

a press positioning assembly, positioned on the top end of the case body, the press positioning assembly comprising:

a main body, slidably located on an outside of the top end of the case body; and a resisting convex block, fixed to a side of the main body, said resisting convex clock extending through the elongated hole, the resisting convex block being capable of sliding along the elongated hole;

a slide block, received in the cavity of the case body and slidably located between the top end and a bottom end of the case body, the slide block forms a slope surface on an end of the slide block, wherein the slope surface is located adjacent to the elongated hole, the resisting convex block resisting the slope surface;

a fixed pulley, received in the cavity of the case body and located on a side of the slide block;

a brake wire, comprising an outer tube and an inner wire received in the outer tube, a first end of the inner wire is fixed to the slide block after surrounding the fixed pulley, a second end is configured to control a brake member to brake a wheel of the wheeled luggage case; and a resilient member, having two ends abutting an inner sidewall of the case body and the slide block, respectively;

wherein the press positioning assembly is actuated to slide at the top end of the case body, such that the resisting convex block slides from a first end of the slope surface to a second end of the slope surface, and the slide block is urged towards the bottom of the case body, such that the inner wire of the brake wire driven by the slide block controls the brake member to brake the wheel of the wheeled luggage case.

2. The control device according to claim 1, wherein the case body comprises a front housing and a rear housing, the front housing defines a receiving groove, the rear housing seals an opening of the receiving groove and forms the cavity of the case body, wherein said cavity is defined by said rear housing and said receiving groove of said front housing.

3. The control device according to claim 2, wherein the front housing comprises two spaced guide blocks located at the bottom of the receiving groove and a restriction column positioned between the two guide blocks, the slide block defines an elongated restriction hole in a middle portion of said slide block, the restriction column extends through the restriction hole, the slide block is constrained between the two guide blocks, such that the slide block is capable of sliding between the top end and the bottom end of the case body.

4. The control device according to claim 2, wherein the receiving groove defines a latch groove at a margin of a bottom of said receiving groove, and the outer tube of the brake wire is latched in the latch groove.

5. The control device according to claim 1, wherein the case body is provided with two parallel spaced rails located on the outside of the top end of said case body, the main body is located between the two rails sliding along the two rails.

6. The control device according to claim 1, wherein the slope surface is a wedge surface, convex curved surface or depressed curved surface formed on the end of the slide block.

7. The control device according to claim 1, wherein the slide block is provided with a positioning column at an end of said slide block adjacent to the bottom of the case body, the resilient member is a compressed spring or elastic rubber tube having one end abutting the inner sidewall of the case body, the other end being sleeved on the positioning column.

8. The control device according to claim 1, further comprising a second fixed pulley and a second inner wire, wherein the slide block is positioned between the two fixed pulleys, said first end of the inner wire and a first end of said second inner wire surround a respective one of the two fixed pulleys and are respectively fixed to the one end and the another end of the slide block.

9. The control device according to claim 1, wherein the resisting convex block is provided with a pulley at a free end of said resisting convex block capable of rolling on the slope surface.

10. A brake system for a wheeled luggage case, comprising:
- a control device of claim 1;
- a buffer device, comprising:
  - an outer sleeve;
  - an inner sleeve, received in the outer sleeve, and the inner sleeve is capable of sliding along an axial of the outer sleeve, one end of the brake wire extends through a top of the outer sleeve and is fixed to a top of the inner sleeve;
  - an elastic member, received in the outer sleeve and having two ends abutting an inner sidewall of the top of the outer sleeve and the inner sleeve, respectively, thus allowing the inner sleeve to return to an initial position after the inner sleeve slides towards the top of the outer sleeve;
  - a support, one end of the support extends through the bottom of the inner sleeve and is provided with a support gasket, the other end of the support is connected to the brake member for braking the wheel of the wheeled luggage case; and
  - a buffer elastic member, having two ends abutting the support gasket and the inside of the bottom of the inner sleeve;
- the wheel of the wheeled luggage case, defining a plurality of annular tooth spaces surrounding a shaft of the wheel; and
- the brake member, comprising a hook capable of engaging the annular tooth space;
- wherein, with the brake wire being pulled upwards, the inner sleeve slides driven by the brake wire, and the support is moved upwards driven by the inner sleeve, such that the wheel is braked by the brake member, wherein with the wheel is forcibly pushed to rotate, the support is moved downwards and abuts the buffer elastic member, such that the buffer elastic member is deformed, and the hook is urged by the buffer elastic member to slide from one tooth space to another tooth space.

* * * * *